United States Patent
Higuchi

(10) Patent No.: US 10,065,500 B2
(45) Date of Patent: Sep. 4, 2018

(54) VEHICLE BODY STRUCTURE OF AUTONOMOUS TRAVELING VEHICLE

(71) Applicant: Sharp Kabushiki Kaisha, Osaka (JP)

(72) Inventor: Atsushi Higuchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 15/236,668

(22) Filed: Aug. 15, 2016

(65) Prior Publication Data

US 2017/0050517 A1    Feb. 23, 2017

(30) Foreign Application Priority Data

Aug. 20, 2015  (JP) ................................ 2015-162872
Jun. 23, 2016  (JP) ................................ 2016-124785

(51) Int. Cl.

| B60K 17/354 | (2006.01) |
|---|---|
| B60K 17/04 | (2006.01) |
| B60K 17/24 | (2006.01) |
| B60K 17/342 | (2006.01) |
| B60K 17/356 | (2006.01) |
| B60K 7/00 | (2006.01) |
| B62D 21/02 | (2006.01) |

(52) U.S. Cl.
CPC .......... *B60K 17/354* (2013.01); *B60K 7/0007* (2013.01); *B60K 17/24* (2013.01); *B60K 17/342* (2013.01); *B60K 17/356* (2013.01); *B62D 21/02* (2013.01); *B60K 17/043* (2013.01); *B60K 2007/0076* (2013.01)

(58) Field of Classification Search
CPC .. B60K 17/342; B60K 17/354; B60K 17/043; B60K 17/24; B60K 17/356; B60K 7/0007; B60K 2007/0076; B62D 21/02
See application file for complete search history.

(56) References Cited

U.S. PATENT DOCUMENTS

| 4,210,219 A * | 7/1980 | Oswald ................... B60B 37/00 |
|---|---|---|
| | | 180/24.12 |
| 5,290,201 A * | 3/1994 | Tesker .................. B60K 17/105 |
| | | 180/24.11 |
| 5,337,849 A * | 8/1994 | Eavenson, Sr. ...... B60K 17/342 |
| | | 180/24.12 |

(Continued)

FOREIGN PATENT DOCUMENTS

JP          2013-244896 A       12/2013

*Primary Examiner* — Laura Freedman
(74) *Attorney, Agent, or Firm* — Renner Otto Boisselle & Sklar, LLP

(57) ABSTRACT

To provide a vehicle body structure for an autonomous traveling vehicle equipped with wheels arranged to a chassis thereof, including; side frames arranged on both sides in a width direction of the chassis and each extended in a longitudinal direction of the chassis; a first drive unit having a drive motor, a drive shaft, a first pulley and a first pulley box; a second drive unit having an axle for supporting the wheel and a second pulley and a second pulley box; and an endless belt. The first pulley box has a first opening formed on a side surface, with respect to an axial direction of the drive shaft while the second pulley box has a second opening formed on a side surface with respect to an axial direction of the axle. The vehicle body structure includes bearing covers for covering the first and second openings.

8 Claims, 12 Drawing Sheets

(56) References Cited

U.S. PATENT DOCUMENTS

| | | | | | |
|---|---|---|---|---|---|
| 5,964,567 | A | * | 10/1999 | Bamford | B60K 17/04 180/6.2 |
| 6,779,617 | B1 | * | 8/2004 | Kole, Jr. | B60K 17/342 180/24.08 |
| 6,786,289 | B2 | * | 9/2004 | Bateman | B60K 17/04 180/305 |
| 7,000,724 | B2 | * | 2/2006 | Lamela | B60G 5/02 180/24.05 |
| 7,198,121 | B2 | * | 4/2007 | Lamela | B60K 17/342 180/6.48 |
| 7,921,942 | B2 | * | 4/2011 | Schafer | B60K 17/26 180/9.21 |
| 8,016,065 | B2 | * | 9/2011 | Osborn | B60K 1/02 180/233 |
| 8,056,662 | B2 | * | 11/2011 | Schoon | B60K 1/02 180/245 |
| 2016/0355092 | A1 | * | 12/2016 | Higuchi | B60L 11/18 |

* cited by examiner

VEHICLE BODY STRUCTURE OF AUTONOMOUS TRAVELING VEHICLE

This Nonprovisional application claims priority under 35 U.S.C. § 119(a) on Patent Application No. 2015-162872 filed in Japan on 20 Aug. 2015 and Patent Application No. 2016-124785 filed in Japan on 23 June 2016, the entire contents of which are hereby incorporated by reference.

BACKGROUND OF THE INVENTION (1) Field of the Invention
[Technical Field]

The present invention relates to a vehicle body structure of an autonomous traveling vehicle, in particular relating to a vehicle body structure of an autonomous traveling vehicle that travels on wheels attached to the chassis.

(2) Description of the Prior Art
[Background Art]

Conventionally, there has been a known autonomous traveling vehicle that has two wheels arranged in the longitudinal direction on each side, the two wheels being coupled by a drive transmitting means to drive.

When the drive system of such an autonomous traveling vehicle is configured to use an endless belt as a drive transmitting means, replacement of the endless belt has to be done by dismounting the drive unit from the chassis and disassembling the unit to take out the endless belt. This process needs very complicated tasks including detachment and attachment of the drive unit and disassembly and assembly of the drive unit, making maintenance extremely difficult.

As a prior art technology to deal with the above situation, there has been a disclosure as to improvement in maintenance of a crawler type driving mechanism having crawlers that are arranged in the longitudinal direction or the vehicle and transmit drive similarly to the endless belt. In this mechanism, the crawlers are configured to be removable from the vehicle chassis to thereby achieve improvement in maintenance (see Patent Document 1).

PRIOR ART DOCUMENTS

Patent Documents

Patent Document 1

Japanese Patent Application Laid-open No. 2013-244896

OUTLINE OF THE INVENTION

Problems to be Solved by the Invention

However, recently there have beers demands for miniature autonomous traveling vehicles that can be easily controlled and efficiently used in narrow areas.

Under these circumstances, in the field of autonomous traveling vehicles that are smaller compared to those adopting the crawler type driving mechanism according to Patent Document 1, four-wheeled autonomous traveling vehicles using skid-steer drive that enables steering and turning at a fixed point without needing a large steering space, by actuating the left and right wheels at different rates of revolutions, have of ten been adopted.

However, when the autonomous traveling vehicle of this kind is constructed so that the endless belts for driving the wheels can be attached to and detached from the side of the chassis, the rotational axle of the wheels needs to take a cantilevered structure, causing a problem that the support of the wheels becomes unstable.

SUMMARY OF THE INVENTION

In view of the above problem, it is therefore an object of the present invention to provide a vehicle body structure for autonomous traveling vehicle which is excellent in maintenance performance free from the problem of the support of the wheels becoming unstable.

Means for Solving the Problems

In order to achieve the above object, the vehicle body structure of autonomous traveling vehicle according to the present invention is configured as follows:

The first aspect of the present invention resides in a vehicle body structure for an autonomous traveling vehicle equipped with first and second wheels attached to a chassis, comprising:

first and second side frames arranged on both sides in a width direction of the chassis and each extended in a front-to-rear direction of the chassis;
 a first drive body;
 a second drive body; and,
 a third drive transmitting member (e.g., an endless belt), and
   the first drive body comprising;
   a driver used for driving a first wheel;
   a drive shaft for driving the first wheel;
   a first drive transmitting member (e.g., a first pulley) to which drive force is transmitted from the drive shaft; and
   a first drive transmitting member casing for accommodating the first drive transmitting member,
   the second drive body comprising:
   an axle for supporting a second wheel;
   a second drive transmitting member (e.g., a second pulley) that transmits drive force to the axle; and
   a second drive transmitting member casing for
   accommodating the second drive transmitting member; wherein
   the third drive transmitting member couples the first drive transmitting member and the second drive transmitting member to transmit drive force,
   the first drive body and the second drive body are arranged on the same side frame,
   the first drive transmitting member casing has a first opening portion on a side surface with respect to an axial direction of the drive shaft,
   the second drive transmitting member casing has a second opening portion, on a side surface with respect to an axial direct ion of the axle,
   the vehicle body structure is equipped with a covering member that covers the first and second opening portions, and
   the covering member includes:
   a first bearing part that rotatably supports the drive shaft; and
   a second bearing part that rotatably supports the axle.

The second aspect of the present invention resides in that the first opening portion is formed to have size greater than an outside diameter of the first drive transmitting member, and the second opening portion is formed to have size greater than the outside diameter of the second drive transmitting member.

The third aspect of the present invention resides in that the first opening portion has a first cutout portion at one side end on the side surface of the first drive transmitting member casing so as to allow the third drive transmitting member to pass through the first cutout portion and the second opening portion has a second cutout portion at one side end on the side surface of the second, drive transmitting member casing so as to allow the third drive transmitting member to pass through the second cutout portion.

The fourth aspect of the present invention resides in that an attachment of the covering member to the first opening portion and/or the second opening portion is formed in a tapered attachment configuration.

The fifth aspect of the present invention resides in that the first bearing part and/or the second bearing part arranged in the covering member uses a cone bearing.

The sixth aspect of the present invention resides in that the third drive transmitting member is arranged on an interior side of the chassis than the first side frame and/or the second side frame, and the first side frame and/or the second side frame are/is equipped with a covering member that encloses the third drive transmitting member.

The seventh aspect of the present invention resides in further inclusion of a moving mechanism in the first side frame and/or the second side frame for moving the second drive body forwards and backwards along the first side frame and/or the second side frame relative to the first drive body, and that attachment and detachment of the third drive transmitting member is performed by moving the second drive body forwards and backwards by means of the moving mechanism.

The eighth aspect of the present invention resides in that the first wheel and/or the second wheel include/includes a tire member and a wheel member supporting the tire member.

the covering member is removably attached to the first drive transmit ting member casing and the second drive transmitting member casing by a fastener, and the wheel member is formed with a wheel opening portion at a position opposite to the fastener for attaching the covering member so as to allow attachment and detachment of the fastener from an outer side of the wheel member regarding the chassis.

Advantages of the Invention

According to the first aspect of the present invention, while the wheels can be supported stably, dismounting of the covering member makes it possible to easily attach and detach the third drive transmitting member from the first drive transmitting member casing and the second drive transmitting member casing. As a result, it is possible to realize a vehicle body structure for autonomous traveling vehicle that is excellent in maintenance performance.

BRIEF DESCRIPTION OF THE DRAWINGS

[Brief Description of the Drawings]

Figure 1:
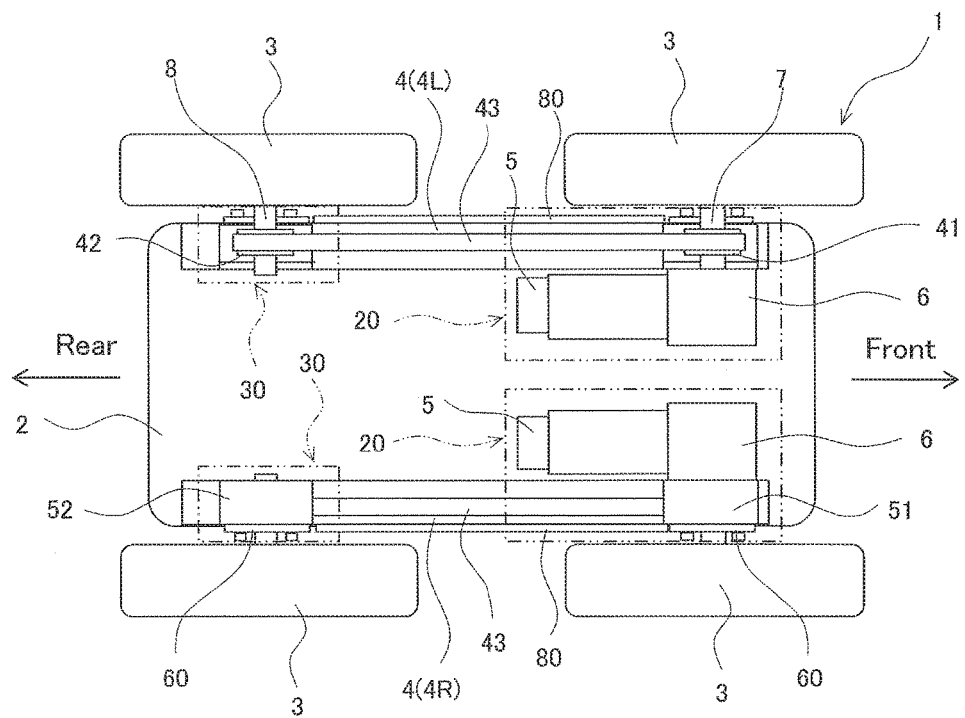

FIG. 1 is an illustrative diagram in a plan view showing an overall configuration of a vehicle body structure of an autonomous traveling vehicle according to the first embodiment of the present invention.

Figure 2:
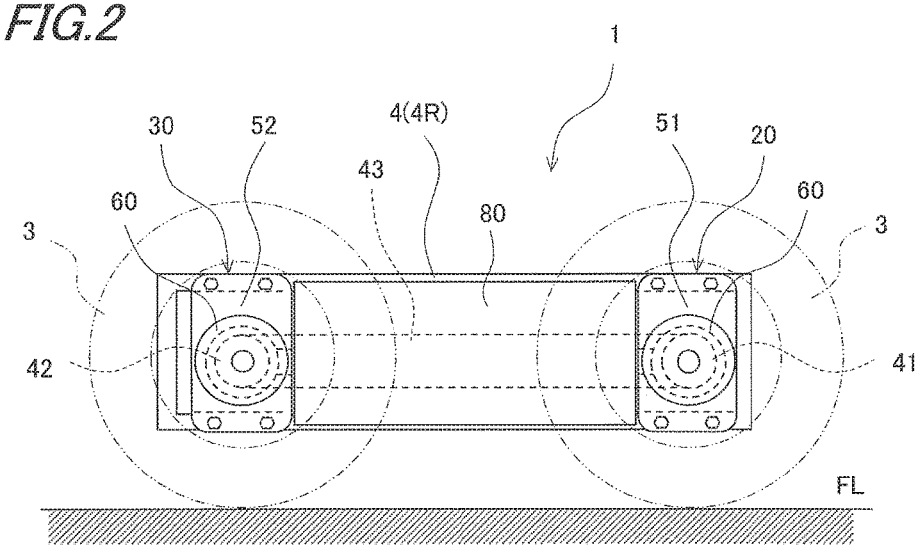

FIG. 2 is an illustrative diagram in a side view showing the overall configuration of the vehicle body structure of the autonomous traveling vehicle.

Figure 3:
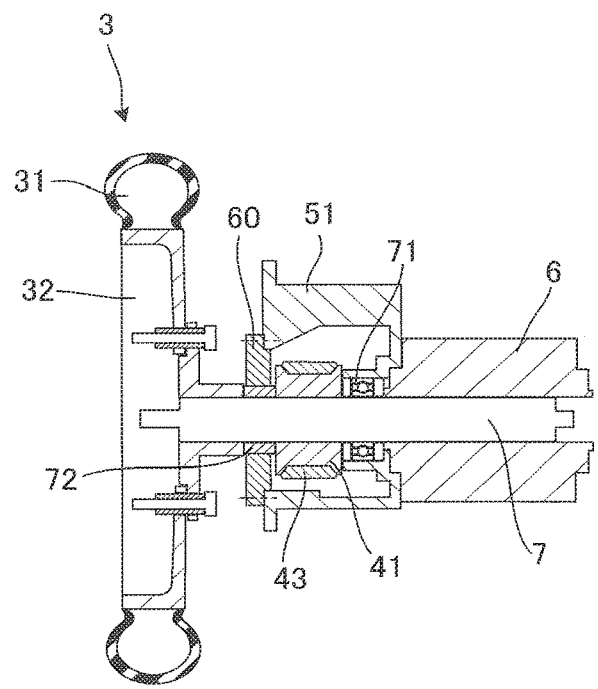

FIG. 3 is an illustrative diagram showing a state where a wheel has been attached to a first drive unit forming the autonomous traveling vehicle.

Figure 4:
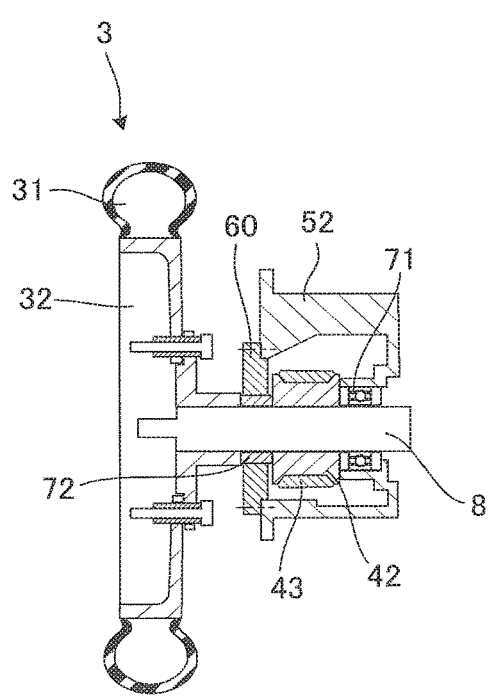

FIG. 4 is a side sectional view showing the arrangement of the first drive unit and wheel.

Figure 5:
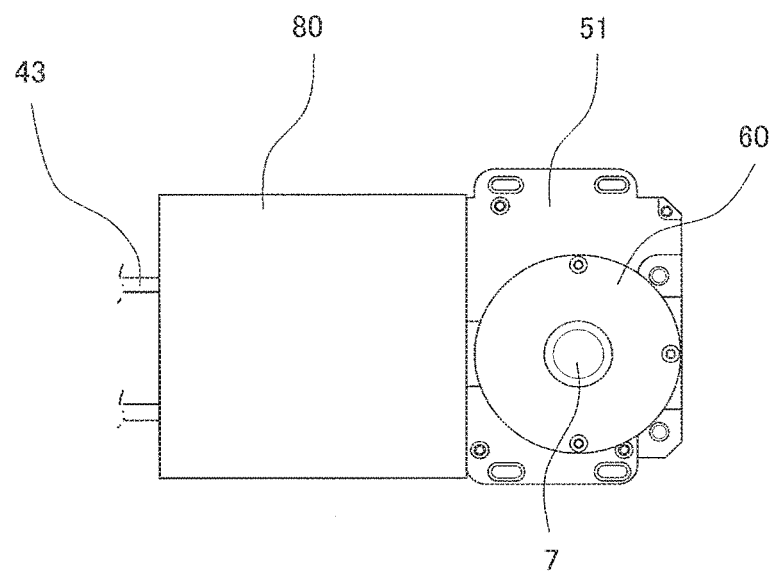

FIG. 5 is a front view showing a configuration of a bearing cover and a protecting cover of the first drive unit.

Figure 6:
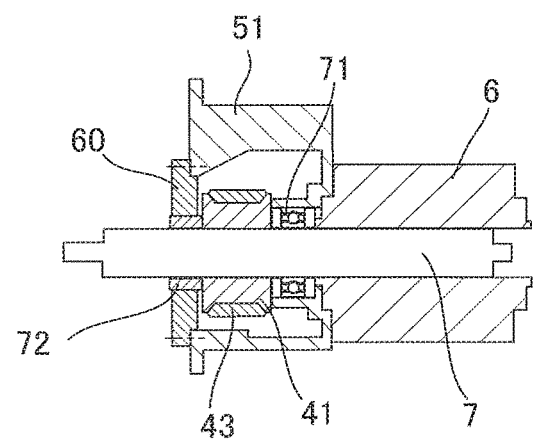

FIG. 6 is a side sectional view showing a configuration of the bearing cover.

Figure 7:
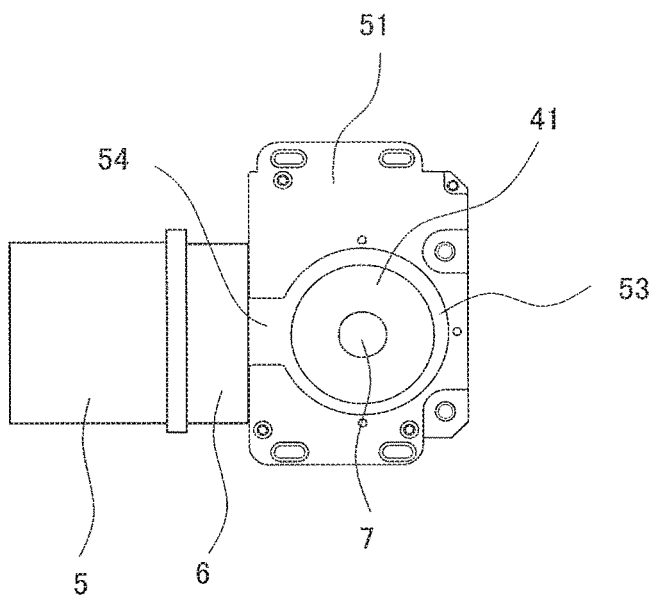

FIG. 7 is a front view showing a configuration of a first pulley box of the first drive unit.

Figure 8:
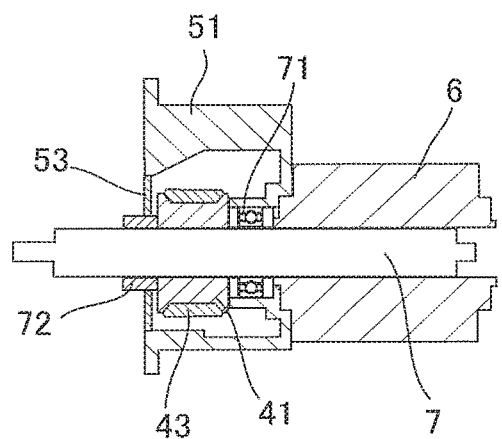

FIG. 8 is a side sectional view showing a configuration of the first pulley box.

Figure 9:
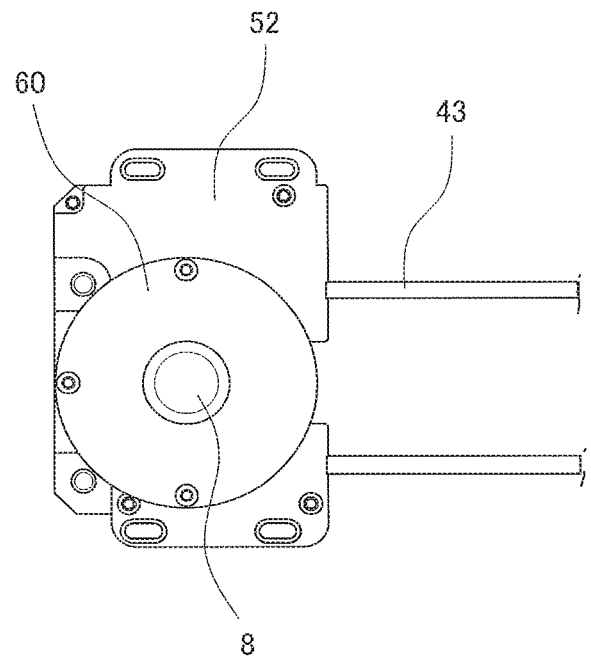

FIG. 9 is a front view showing a configuration of a bearing cover of a second drive unit forming the autonomous traveling vehicle.

Figure 10:
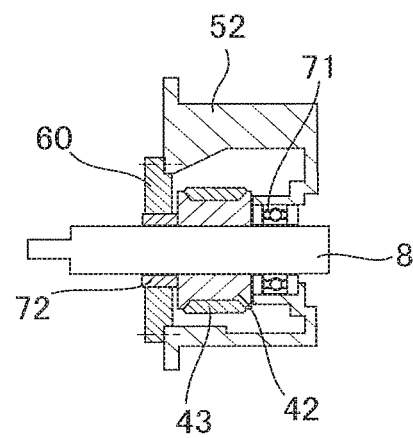

FIG. 10 is a side sectional view showing a configuration of the bearing cover.

Figure 11:
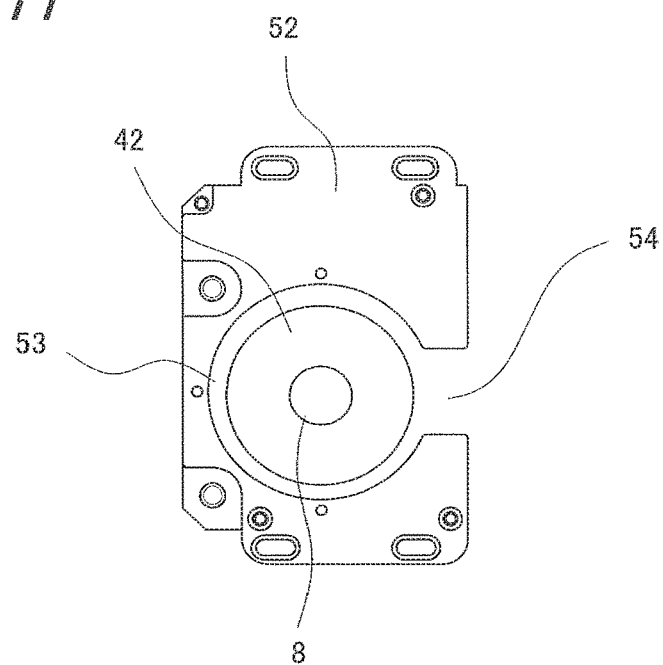

FIG. 11 is a front view showing a configuration of a second pulley box of the second drive unit.

Figure 12:
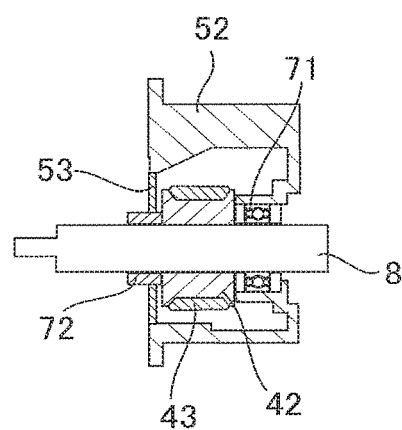

FIG. 12 is a side sectional view showing a configuration of the second pulley box.

Figure 13:
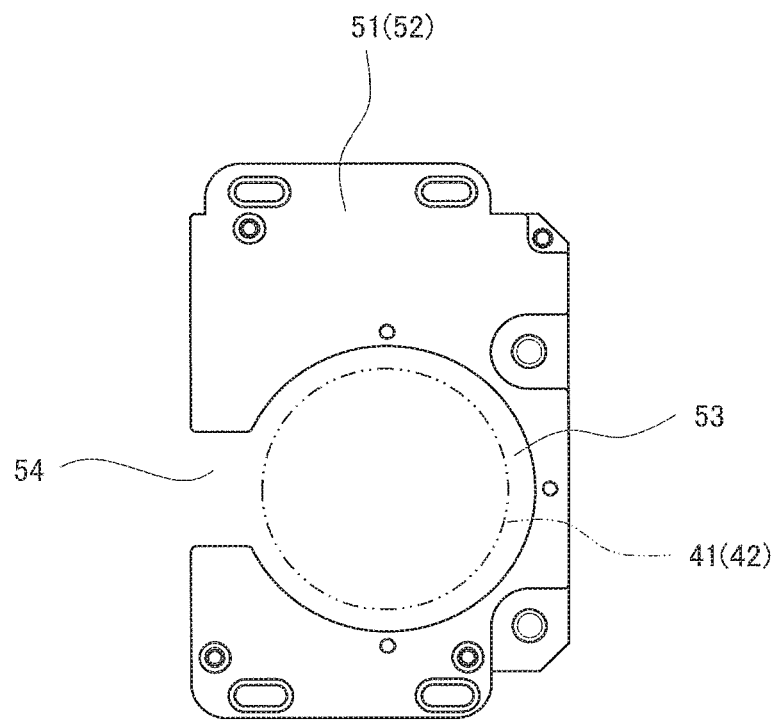

FIG. 13 is an illustrative diagram showing an opening portion of the first pulley box.

Figure 14:
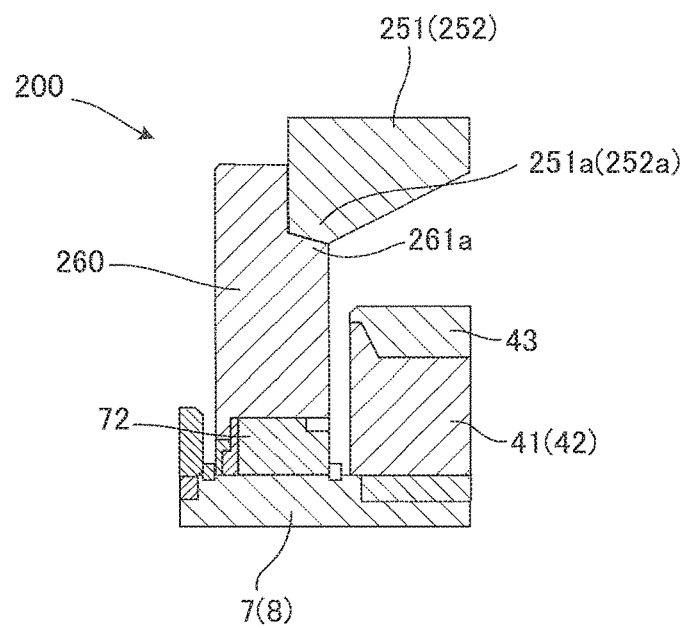

FIG. 14 is an illustrative diagram showing the arrangement of attachment between a pulley box and a bearing cover for constituting a vehicle body structure for autonomous traveling vehicle according to the second embodiment of the present invention.

Figure 15:
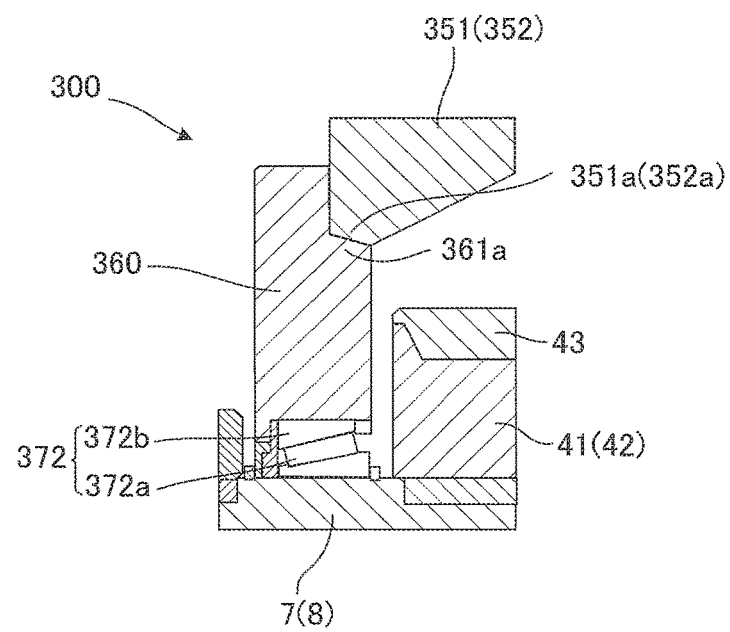

FIG. 15 is an illustrative diagram showing the arrangement of attachment between a pulley box and a bearing cover for constituting a vehicle body structure for autonomous traveling vehicle according to the third embodiment of the present invention.

Figure 16:
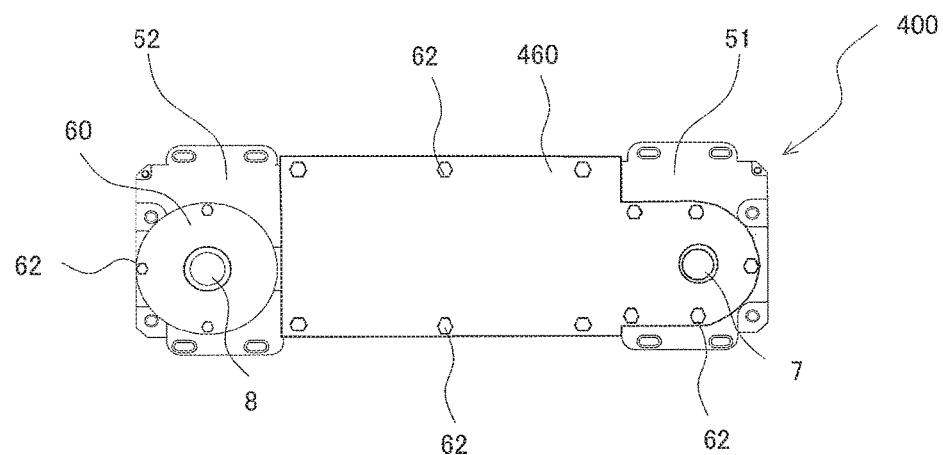

FIG. 16 is an illustrative diagram showing a configuration of a bearing cover of a pulley box and a protecting cover of a side frame for constituting a vehicle body structure for autonomous traveling vehicle according to the fourth embodiment of the present invention.

Figure 17:
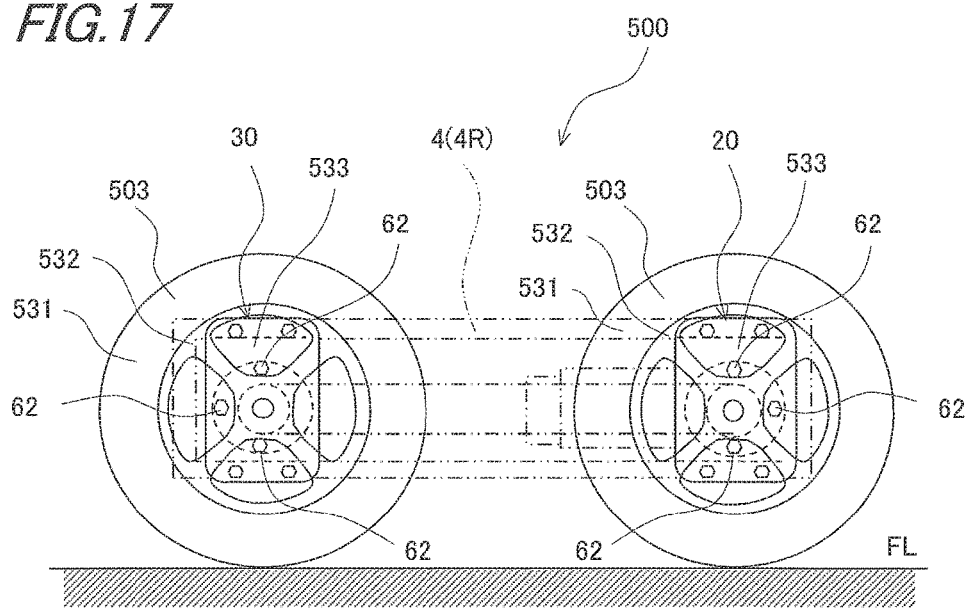

FIG. 17 is an illustrative diagram as viewed from the side, showing an attachment state of wheels to drive units in the vehicle body structure for autonomous traveling vehicle according to the fifth embodiment of the present invention.

Figure 18:
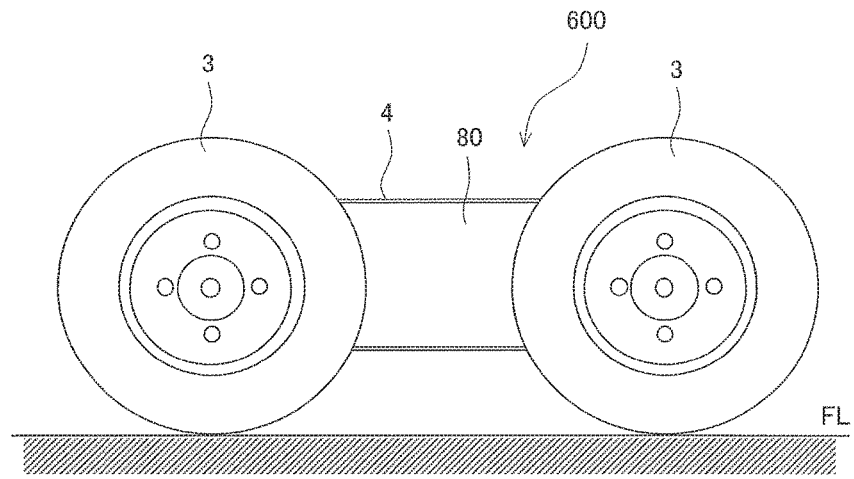

FIG. 18 is an illustrative diagram as viewed from the side, showing a configuration of a vehicle body structure for autonomous traveling vehicle of the sixth embodiment of the present invention.

Figure 19:
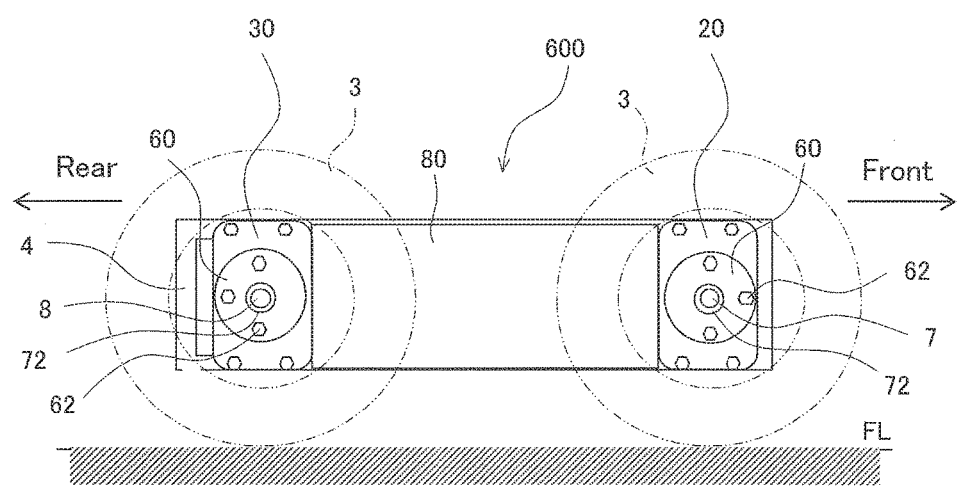

FIG. 19 is an illustrative diagram as viewed from the side, showing a configuration of the vehicle body structure in a state that tired wheels have been taken out from the autonomous traveling vehicle.

Figure 20:
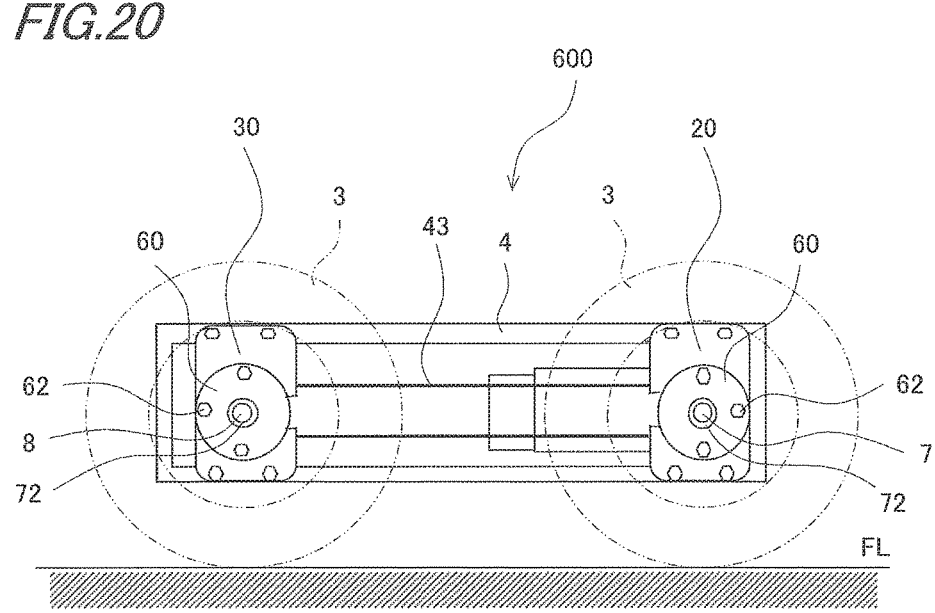

FIG. 20 is an illustrative diagram as viewed from the side, showing a state where a protecting cover has been removed from the vehicle body structure.

Figure 21:
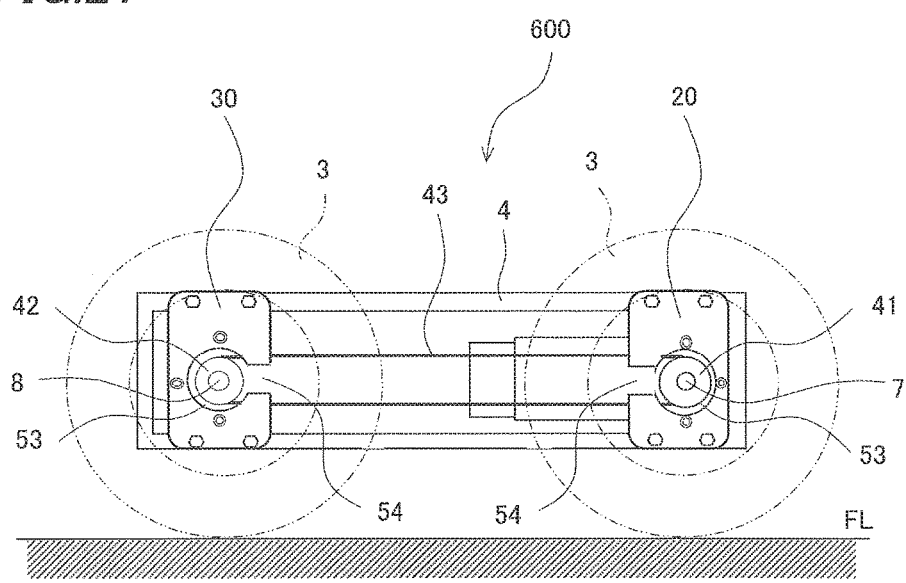

FIG. 21 is an illustrative diagram as viewed from the side, showing a state where a bearing cover has been removed from the vehicle body structure.

Figure 22:
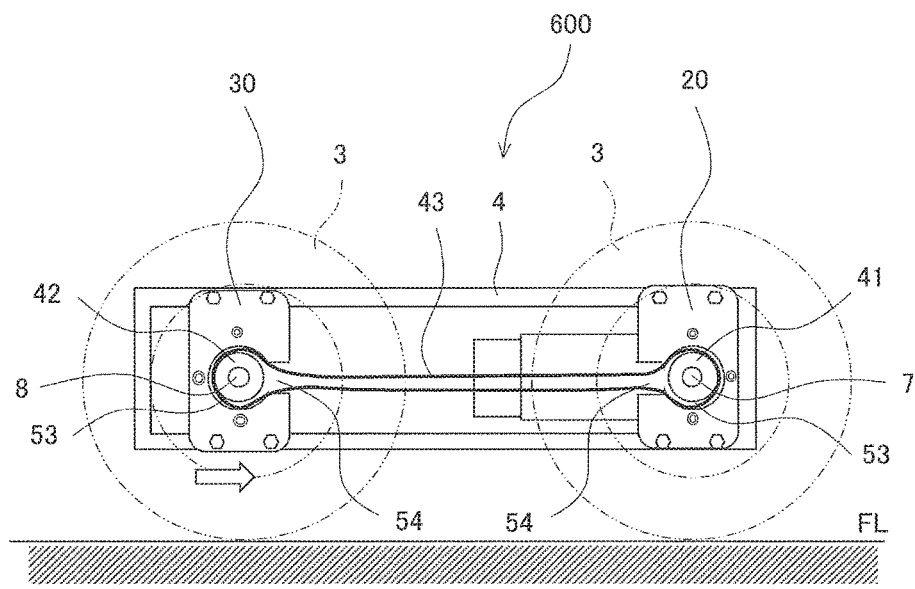

FIG. 22 is an illustrative diagram as viewed from the side, showing a state where an endless belt has been removed from the vehicle body structure.

Figure 23:
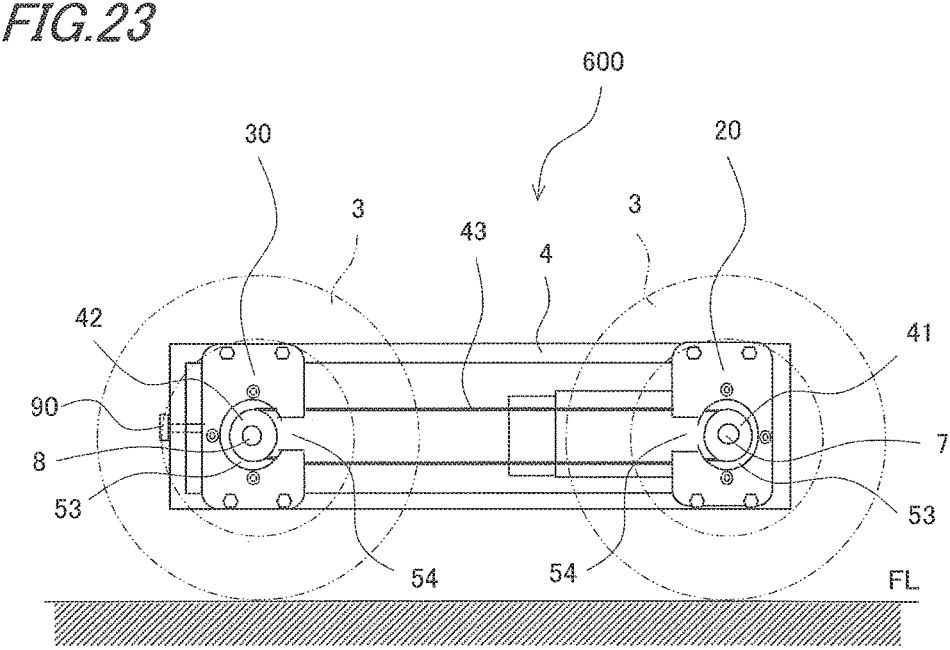

FIG. 23 is an illustrative diagram showing a configuration of a moving means for moving the second drive unit in order for attachment and removal of an endless belt in the vehicle body structure.

DESCRIPTION OF THE PREFERRED EMBODIMENTS

Modes for Carrying Out the Invention

The First Embodiment

Now, embodiments of vehicle body structure of autonomous traveling vehicle of the present invention will be described with reference to the drawings.

FIG. 1 shows one example of an embodied mode of the present invention and is an illustrative diagram in a plan view showing an overall configuration of a vehicle body structure of an autonomous traveling vehicle according to the first embodiment of the present invention; FIG. 2 is an illustrative diagram in a side view showing the overall configuration of the vehicle body structure of the autonomous traveling vehicle; FIG. 3 is an illustrative diagram showing a state where a wheel has been attached to a first drive unit forming the autonomous traveling vehicle; FIG. 4 is a side sectional view showing the arrangement of the first drive unit and wheel; FIG. 5 is a front view showing a configuration of a bearing cover and a protecting cover of the first drive unit; FIG. 6 is a side sectional view showing a configuration of the bearing cover; FIG. 7 is a front view showing a configuration of a first pulley box of the first drive unit; FIG. 8 is a side sectional view showing a configuration of the first pulley box; FIG. 9 is a front view showing a configuration of a bearing cover of a second drive unit forming the autonomous traveling vehicle; FIG. 10 is a side sectional view showing a configuration of the bearing cover; FIG. 11 is a front view showing a configuration of a second pulley box of the second drive unit; FIG. 12 is a side sectional view showing a configuration of the second pulley box; and, FIG. 13 is an illustrative diagram showing an opening portion of the first pulley box.

A vehicle body structure 1 for autonomous traveling vehicle according to the first embodiment is a vehicle body structure for an autonomous traveling vehicle that travels by wheels 3 arranged on a chassis 2, as shown in FIG. 1.

Herein, an autonomous traveling vehicle is an apparatus that autonomously travels on a mechanical or program basis without being controlled by human decision-making. A known example of the autonomous traveling vehicle is an autonomous industrial truck for transporting some stuff in a factory.

The vehicle body structure 1 of autonomous traveling vehicle of the first embodiment includes, mainly, the chassis 2, wheels (first wheels and second wheels) 3, side frames 4 (4R, 4L), drive motors (driving part) 5 for driving wheels (first wheels) 3, speed reducers (drive transmitters) 6, drive shafts 7 for driving wheels (first wheels) 3 and axles 6 for supporting wheels (second wheels) 3.

The configuration of the vehicle body structure 1 of the autonomous traveling vehicle of the first embodiment will be described with reference to the drawings.

The chassis 2 that constitutes the vehicle body structure 1 of the autonomous traveling vehicle is given in a rectangular form with its long side oriented in the front-to-rear direction. A pair of side frames 4R and 4L extending in the longitudinal direction of the chassis are arranged on each side in the width direction of the chassis.

The side frames 4R and 4L are formed in a rectangular frame-shaped configuration.

The side frames 4R and 4L may be configured by tubular structural members having a rectangular section, for example.

In the first embodiment, there are first drive units (first drivers) 20 each including a drive motor 5, speed reducer (e.g., gear box) 6 and drive shaft 7 as an integrated unit and second drive units (second drivers) 30 each including an integrated unit structure for rotatably supporting an axle 8. In FIGS. 1 and 2, wheels 3 have been mounted to the first drive units 20 and the second drive units 30. A reference numeral FL (FIG. 2) designates an indoor floor surface or outdoor ground surface. Each wheel 3 is a tired wheel having a tire 31 and a wheel 32, but can be a tireless wheel.

The first drive unit 20 and the second drive unit 30 are coupled by an endless belt (third drive transmitting member 43 to transmit drive.

Provided on the drive shaft 7 of the first drive unit 20 is a first pulley (first endless member driver) 41 that transmits drive to the endless belt 43.

Provided on the axle 8 of the second drive unit 30 is a second pulley (second endless member driver) 42 that is driven by the endless belt 43 to drive the axle 8.

The first drive unit 20 includes a first pulley box (first drive transmitting member casing) 51 that supports the drive shaft 7 and accommodates the first pulley 41, as shown in FIG. 3.

As shown in FIGS. 7 and 8, the first pulley box 51 has an opening 53 (first opening portion) on the side facing the wheel 3 side with respect to the direction in which the drive shaft 7 extends (the axial direction) so as to allow access to the endless belt 43 for its attachment and removal as well as having a bearing cover (covering member of cover portion) 60 (FIGS. 5 and 6) for covering the opening 53. A bearing 72 (FIGS. 5 and 6) for rotatably supporting the drive shaft 7 is provided on the drive shaft 7. When the bearing-cover 60 is attached to the opening 53, the bearing 72 snugly fits into the center hole of the bearing cover 60 so as to support and position the bearing 72 by the hearing cover 60.

In the first drive unit 20, the first pulley box 51 accommodates the first pulley 41 while the drive shaft 7 is rotatably supported at both ends, i.e., by a bearing 71 (FIGS. 3, 4 and 6) arranged on the side facing the drive motor 5 (the interior side of the side frame) and by the bearing (the first bearing portion) 72 provided with the bearing cover 50.

Integrally attached to the first pulley box 51 is the speed reducer 6, which is disposed on the more interior side of the vehicle body than the side frame 4. An outer dimension in the vertical direction of the speed reducer 6 is specified to be smaller than an outer dimension of the first pulley box 51. That is, when the first drive unit 20 is attached to the side frame 4, the speed reducer 6 is passed through and inserted inside the side frame 4 so as to be set inside the chassis 2 while the first pulley box 51 is arranged within the side frame 4.

The second drive unit 30 includes, as shown in FIG. 4, a second pulley box (second drive transmitting member casing) 52 that supports the axle 8 and accommodates a second pulley 42.

As shown in FIGS. 11 and 12, the second pulley box 52 has an opening 53 (second opening portion) formed on the side facing the wheel 3 side with respect to the axial direction of the axle 8 so as to allow access to the endless belt 43 for its attachment and removal as well as having a bearing cover 60 (FIGS. 9 and 10) for covering the opening 53. As shown in FIGS. 10 and 12, a bearing 72 for rotatably supporting the axle 8 is provided on the axle 8. When the bearing cover 60 is attached to the opening 53, the bearing 72 snugly fits into the center hole of the bearing cover 60 so as to support and position the bearing 72 by the bearing cover 60.

Further, in the first pulley box 51 and/or the second pulley box 52, it is also possible to provide a configuration where the bearing 72 is fixed beforehand to the bearing cover 60.

Moreover, the hole itself in the bearing cover 60 that supports the drive shaft 7 or axle 8 may be integrally formed with a bearing member such as a sliding bearing so as to provide a bearing function.

In the second drive unit 30, the second pulley box 52 is configured so as to accommodate the second pulley 42 while the axle 8 is rotatably supported at both ends, i.e., by a bearing 71 arranged on a side surface of the far side from the wheel (the interior side of the side frame) and by the bearing 72 (the second bearing portion) provided with the bearing cover 60.

When the second drive unit 30 is attached to the side frame 4, the second pulley box 52 is arranged sidewards from the outer side of the side frame 4 and into the inside of the side frame 4.

Openings 53 of the first pulley box 51 and the second pulley box 52 are formed to have size greater than the outside diameter of the first pulley 41 or the second pulley, as shown in FIGS. 7, 11 and 13.

Side surface of the first pulley box 51 and the second pulley box 52 each has a cutout portion 54 (first cutout portion, second cutout portion) (FIGS. 7, 11 and 13) formed on the one side edge thereof so as to allow endless belt 43 to pass through.

As shown in FIGS. 1 and 2, the first drive unit 20 and the second drive unit 30 are arranged so as to be integrally attachable to, and detachable from, the side frame 4R or 4L on the same side, from the outer side of the vehicle body.

Provided on the vehicle's side face outside the side frame 4R/4L is a protecting cover (covering member) 80 for covering the endless belt 43 arranged inside the side frame 4R/4L, as shown in FIGS. 1 and 2.

Protecting cover 80 is disposed so as to enclose the space between the first drive unit 20 and the second drive unit 30 on the side frame 4R/4L.

As has been described heretofore, the vehicle body structure 1 for autonomous traveling vehicle according to the first embodiment includes side frames 4R and 4L; first drive units 20 each including an integrated unit of drive motor 5, speed reducer 6, drive shaft first pulley 41 and first pulley box 51; second drive units 30 each including an integrated unit structure of axle 8, second pulley 42 and second pulley box 52; and endless belt 43 that couples the first pulley 41 and the second pulley 42.

In the vehicle body structure 1 for autonomous traveling vehicle, the first drive unit 20 and the second drive unit 30 are each integrally attached in a removable manner to the same side frame 4R/4L.

Further, the drive shaft 7 and axel 8 each is supported rotatably at two points located along their corresponding axis.

Moreover, the first pulley box 51 and the second pulley box 52 have the sideward opening 53 on the outer side surface of the vehicle body with respect to the axial direction of the drive shaft 7 or axle 8.

Further, the vehicle body structure 1 for autonomous traveling vehicle has the bearing cover 60 that covers the opening 53.

Provision of the bearing 72 for rotatably supporting the drive shaft 7 or axle 3 in the bearing cover 60 makes it possible to stably support the wheel 3 and facilitates attachment of the endless belt 43 to, and removal from, the first and second pulley boxes 51 and 52, by dismounting bearing covers 60. Since this configuration enables easy maintenance in replacing the endless belt 43, bearings 72 and the like without dismounting the first drive unit 20 and/or the second drive unit 30, it is possible to realize a vehicle body structure for autonomous traveling vehicle excellent in maintenance performance.

Further, in the first embodiment, provision of the protecting cover 80 on the exterior side surface of the side frame 4R/4L prevents penetration of mud and the like into the inside of the side frame 4R/4L, hence makes it possible to protect the endless belt 43.

Also, in the first embodiment, formation of the cutout 54 connecting to the opening 53 in the first and second pulley boxes 51 and 52 further facilitates attachment and detachment of the endless belt 43.

It is possible by providing openings 53 alone to attach and remove the endless belt 43 without provision of cutouts 54 in the first and second pulley boxes 51 and 52. For example, sizing the configuration of the opening 53 to be greater than the outside diameter of the first pulley 41 or second pulley 42, makes it possible to facilitate attachment and detachment of the endless belt 43.

The Second Embodiment

Next, the second embodiment of the present invention will be described with reference to the drawings.

FIG. 14 is an illustrative diagram showing the arrangement of attachment between a pulley box and a bearing cover for constituting a vehicle body structure for autonomous traveling vehicle according to the second embodiment of the present invention.

Here, in the vehicle body structure for autonomous traveling vehicle in the second embodiment, the same components as those in the vehicle body structure 1 for autonomous traveling vehicle of the first embodiment are allotted with the same reference numerals without description.

As shown in FIG. 14, in a vehicle body structure 200 for autonomous traveling vehicle according to the second embodiment, the arrangement of attachment of a bearing cover 260 to first and second pulley boxes 251 and 252 has a tapered configuration.

In the second embodiment, the attachment part 261a of the bearing cover 260 is tapered toward the distal end. The attachment part 251a (252a) of the first pulley box 251 (or the second pulley box 252) mating the attachment part 251a is formed to be open as tapering toward the interior of the vehicle body.

The second embodiment thus configured enables easy attachment and detachment of the bearing cover 260 relative to the first pulley box 251 and second pulley box 252.

The Third Embodiment

Next, the third embodiment of the present invention will be described with reference to the drawings.

FIG. 15 is an illustrative diagram showing the arrangement of attachment between a pulley box and a bearing cover for constituting a vehicle body structure for autonomous traveling vehicle according to the third embodiment of the present invention.

Here, in the vehicle body structure for autonomous traveling vehicle in the third embodiment, the same components as those in the vehicle body structure 1 for autonomous traveling vehicle of the first embodiment are allotted with the same reference numerals without description.

As shown in FIG. 15, in a vehicle body structure 300 for autonomous traveling vehicle according to the third embodiment, the arrangement of attachment of a bearing cover 360 to first pulley box 351 and second pulley box 352 has a tapered configuration while a bearing 372 on the bearing cover 360 side employs a cone bearing.

In the third embodiment, the attachment part 361a of the bearing cover 360 is tapered toward the distal end. The attachment part 351a (352a) of the first pulley box 351 (or the second pulley box 352) mating the attachment part 361a is formed to be open as tapering toward the interior of the vehicle body.

Further, in the third embodiment, the bearing 372 is constructed so that the inner ring 372a is attached on the drive shaft 7 or axle 8 whereas the outer ring 372b is attached to the bearing cover 360.

The third embodiment thus configured enables easy attachment and detachment of the bearing cover 360 relative to the first pulley box 351 and second pulley box 352 as well as enabling easy positioning the axes of the drive shaft 7 and the axle 8.

The Fourth Embodiment

Next, the fourth embodiment of the present invention will be described with reference to the drawings.

FIG. 16 is an illustrative diagram showing a configuration of a bearing cover of the pulley box and a protecting cover of the side frame for constituting a vehicle body structure for autonomous traveling vehicle according to the fourth embodiment of the present invention.

Here, in the vehicle body structure for autonomous traveling vehicle in the fourth embodiment, the same components as those in the vehicle body structure 1 for autonomous traveling vehicle of the first embodiment are allotted with the same reference numerals without description.

As shown in FIG. 16, a vehicle body structure 400 for autonomous traveling vehicle according to the fourth embodiment includes a protecting cover 460 that integrally provides both the functions of the protecting cover for protecting the endless belt and the bearing cover.

In the fourth embodiment, the protecting cover 460 serving as both the bearing cover for the first pulley box 51 and the protecting cover for the side frame 4R/4L and a bearing cover 68 of the second pulley box 52 constitute the protective enclosure for protecting the interior of the side frame 4R/4L in the autonomous traveling vehicle. Designated at 62 are fasteners.

According to the fourth embodiment thus configured, it is possible to easily perform attachment and detachment work of the protecting cover 460 on the basis of the position of the drive shaft 7 of the first pulley box 51.

The Fifth Embodiment

Next, the fifth embodiment of the present invention will be described with reference to the drawings.

FIG. 17 is an illustrative diagram, as viewed from the side, showing an attachment state of tired wheels to the drive units in the vehicle body structure for autonomous traveling vehicle according to the fifth embodiment of the present invention.

In the vehicle body structure for autonomous traveling vehicle in the fifth embodiment, the same components as those in the vehicle body structure 1 for autonomous traveling vehicle of the first embodiment are allotted with the same reference numerals without description.

A vehicle body structure 500 for autonomous traveling vehicle according to the fifth embodiment relates a configuration of wheels 503 attached to the first drive unit 20 and second drive unit 30. The wheel 503 is formed of a tire 531 and a wheel 532 for supporting the tire 531. The wheel 532 with the tire 531 mounted thereon is formed with a plurality of wheel openings 533 at positions opposite to fasteners 62 that fix the bearing covers 60 attached to the first drive unit 20 and second drive unit 30.

The wheel opening 533 is formed with a size that allows access to the fasteners 62 for attachment and detachment from the outside when the wheel is positioned at the predetermined position in the state where the wheels 503 remain mounted on the first, driving unit 20 and second driving unit 30, as shown in FIG. 17.

As constructed above, in the vehicle body structure 500 for autonomous traveling vehicle of the fifth embodiment the wheel 532 of wheel 503 is formed with a plurality of wheel openings 533 at positions opposite to the fasteners 62 for attaching the bearing covers 60 attached to the first drive unit 20 and second drive unit 30. This arrangement makes it possible to attach and detach the fasteners 62 through the wheel openings 533, hence it is possible to dismount the bearing covers 60 and perform attachment and detachment of the endless belt 43 through the opening 53.

The Sixth Embodiment

Next, the sixth embodiment of the present invention will be described with reference to the drawings.

The sixth embodiment gives a specific example where maintenance of the vehicle body structure for autonomous traveling vehicle is performed from the side of the vehicle.

FIG. 18 is an illustrative diagram as viewed from the side, showing a configuration of a vehicle body structure for autonomous traveling vehicle of the sixth embodiment of the present invention; FIG. 19 is an illustrative diagram as viewed from the side, shoving a configuration of the vehicle body structure when the wheels have been taken out from the autonomous traveling vehicle; FIG. 20 is an illustrative diagram as viewed from the side, showing a state where the protecting cover has been removed from the vehicle body structure; FIG. 21 is an illustrative diagram as viewed from the side, showing a state where a bearing cover has been removed from the vehicle body structure; FIG. 22 is an illustrative diagram as viewed from the side, showing a state where an endless belt is removed from the vehicle body structure; and, FIG. 23 is an illustrative diagram showing a configuration of a moving means for moving the second drive unit in order for attachment and detachment of the endless belt in the vehicle body structure.

Here, in the vehicle body structure for autonomous traveling vehicle in the sixth embodiment, the same components as those in the vehicle body structure 1 for autonomous traveling vehicle of the first embodiment are allotted with the same reference numerals without description.

Referring to the drawings, the sixth embodiment will be explained about maintenance work of a vehicle body structure 600 for autonomous traveling vehicle by taking an example of replacing the endless belt 43.

As shown in FIG. 18, when the vehicle body structure 1 for autonomous; traveling vehicle with its side surface covered by a protecting cover 80 is maintained, wheels 3 are dismounted first as shown in FIG. 19, so that the first drive unit 20, second drive unit 30 and protecting cover 80 are exposed to allow easy access to the vehicle body structure 1 from the side.

Then, when the interior components of the chassis inside of the side frame 4 need to be maintained, the protecting cover 80 is removed as shown in FIG. 20 to open the interior of the side frame 4 and thereby expose the endless belt 43 and others.

Then, when the endless belt 43 arranged inside of the side frame 4 needs to be removed, the bearing covers 60 are detached from the first drive unit 20 and the second drive unit 30 to open the opening 53 and cutout portion 54, as shown in FIG. 21.

Then, for example, by loosing the attachment state of the second drive unit 30 and, moving the second drive unit 30 toward the first drive unit 20 (in the direction of the arrow), the endless belt 43 is slacked off, as shown in FIG. 22. Then, the endless belt 43 is dismounted at both ends from the first pulley 41 and second pulley 42, whereby the belt can be taken out from the first drive unit 20 and second drive unit 30 through the opening 53 and cutout portion 54.

As the moving mechanism for moving the second drive unit 30 forwards or backwards relative to the first drive unit 20, for example, as shown in FIG. 23, an attachment position adjusting screw 90 may be provided at the end of the side frame 4 and a threaded hole corresponding to the attachment position adjusting screw 90 is arranged in the second drive unit 30, whereby the second drive unit 30 can be moved forwards and backwards along the side frame 4 as the attachment position adjusting screw 90 is turned around.

Though the embodiments have been described heretofore, the present invention should not be limited to the above embodiments and various changes can be made within the range specified in the scope of claims. That is, any embodied mode obtained by combination of technical means modified as appropriate within the scope of claims should be included in the technical scope of the present invention.

DESCRIPTION OF REFERENCE NUMERALS 1, 200, 300, 400 500 vehicle body structure
2 chassis
3, 503 wheel
4 side frame
4R, 4L side frame
5 drive motor
7 drive shaft
8 axle
20 first drive unit (first drive body)
30 second drive unit (second drive body)
41 first pulley (first drive transmitting member)
42 second pulley (second drive transmitting member)
43 endless belt (third drive transmitting member)
51, 251, 351 first pulley box (first drive transmitting member casing)
52, 252, 352 second pulley box (second drive transmitting member casing)
53 opening (first, second opening)
54 cutout portion (first, second cutout portion)
60, 260, 360, 460 bearing cover (covering member)
71, 72, 372 bearing (first, second bearing portion)
80 protecting cover (covering member)
90 attachment position adjusting screw (moving mechanism)
531 tire
533 wheel opening

What is claimed is:

1. A vehicle body structure for a traveling vehicle comprising:
    side frames arranged on both sides in a width direction of a chassis and each extended in a front-to-rear direction of the chassis; and
    a drive body;
    the drive body comprising:
        a driver used for driving a wheel;
        a drive shaft for driving the wheel;
        a drive transmitting member to which drive force is transmitted from the drive shaft; and
        a drive transmitting member casing for accommodating the drive transmitting member, and
    wherein
    the drive body is arranged on at least one of the side frames,
    the drive transmitting member casing has an opening portion on a side surface with respect to an axial direction of the drive shaft,
    the vehicle body structure is equipped with a covering member that covers the opening portion,
    the covering member includes a bearing part that rotatably supports the drive shaft, and
    the opening portion is formed to have a size greater than an outside diameter of the drive transmitting member.

2. The vehicle body structure for the traveling vehicle according to claim 1, further comprising:
    a second drive body; and,
    a third drive transmitting member, and
    the second drive body comprising:
        an axle for supporting a second wheel;
        a second drive transmitting member that transmits drive force to the axle; and
        a second drive transmitting member casing for accommodating the second drive transmitting member;
    wherein
    the third drive transmitting member couples the drive transmitting member and the second drive transmitting member to transmit drive force,
    the drive body and the second drive body are arranged on the same side frame,
    the second drive transmitting member casing has a second opening portion on a side surface with respect to an axial direction of the axle,
    the covering member covers the opening portion and the second opening portion,
    the covering member includes a second bearing part that rotatably supports the axle, and
    the second opening portion is formed to have a size greater than an outside diameter of the second drive transmitting member.

3. The vehicle body structure for the traveling vehicle according to claim 2, wherein the opening portion has a first cutout portion at one side end on the side surface of the drive transmitting member casing so as to allow the third drive transmitting member to pass through the first cutout portion and the second opening portion has a second cutout portion at one side end on the side surface of the second drive transmitting member casing so as to allow the third drive transmitting member to pass through the second cutout portion.

4. The vehicle body structure for the traveling vehicle according to claim 2, wherein an attachment of the covering member to the opening portion and/or the second opening portion is formed in a tapered attachment configuration.

5. The vehicle body structure for the traveling vehicle according to claim 2, wherein the bearing part and/or the second bearing part arranged in the covering member uses a cone bearing.

6. The vehicle body structure for the traveling vehicle according to claim 2, wherein the third drive transmitting member is arranged on a more interior side of the chassis than a first side frame of the side frames and/or a second side frame of the side frames, and the first side frame and/or the second side frame are/is equipped with a covering member that encloses the third drive transmitting member.

7. The vehicle body structure for the traveling vehicle according to claim 2, further comprising a moving mechanism in a first side frame of the side frames and/or a second side frame of the side frames for moving the second drive body forwards and backwards along the side frame and/or the second side frame relative to the drive body, wherein attachment and detachment of the third drive transmitting member is performed by moving the second drive body forwards and backwards by means of the moving mechanism.

8. The vehicle body structure for the traveling vehicle according to claim 2, wherein
- the wheel and/or the second wheel include/includes a tire member and a wheel member supporting the tire member,
- the covering member is removably attached to the drive transmitting member casing and the second drive transmitting member casing by a fastener, and
- the wheel member is formed with a wheel opening portion at a position opposite to the fastener for attaching the covering member so as to allow attachment and detachment of the fastener from an outer side of the wheel member regarding the chassis.

* * * * *